United States Patent [19]
Ikenaga et al.

[11] Patent Number: 4,726,998
[45] Date of Patent: Feb. 23, 1988

[54] MAGNETIC DISK

[75] Inventors: Yukio Ikenaga; Katsuhiko Takahashi, both of Fuji; Kenji Hijikata, Mishima; Toshio Kanoe, Fuji; Tsuneyoshi Okada, Kawasaki, all of Japan

[73] Assignee: Polyplastics Co., Ltd., Osaka, Japan

[21] Appl. No.: 870,812

[22] Filed: Jun. 5, 1986

[30] Foreign Application Priority Data

Jun. 14, 1985 [JP] Japan ................................ 60-129616

[51] Int. Cl.$^4$ .......................... G11B 5/64; G11B 5/70
[52] U.S. Cl. ................................. 428/480; 428/694; 428/900; 428/910
[58] Field of Search ............... 428/480, 694, 900, 910; 360/135, 133

[56] References Cited
U.S. PATENT DOCUMENTS

| | | | |
|---|---|---|---|
| 4,390,683 | 6/1983 | Yatsu et al. | 428/480 |
| 4,415,942 | 11/1983 | Frosch et al. | 360/135 |
| 4,514,452 | 4/1985 | Tanaka et al. | 428/480 |
| 4,606,930 | 8/1986 | Ueno et al. | 428/480 |
| 4,619,869 | 10/1986 | Kiriyama et al. | 428/480 |

OTHER PUBLICATIONS

IBM Technical Disclosure Bulletin, vol. 21, No. 12, May 1979.

Primary Examiner—Paul J. Thibodeau
Attorney, Agent, or Firm—Birch, Stewart, Kolasch & Birch

[57] ABSTRACT

A magnetic disk comprises a substrate of a resin composition comprising a polymer being capable of the anisotropic phase in the molten state and a magnetic layer formed on at least one surface of said substrate. The substrate is a laminate of a plurality, preferably two, of monoaxially oriented sheets, eventually being multiaxially oriented.

47 Claims, No Drawings

MAGNETIC DISK

The present invention relates to a magnetic recording material and, in particular, to a magnetic disk, such as floppy disk.

STATEMENT OF PRIOR ARTS

As a substrate of a magnetic disk, a biaxially stretched polyethylene terephthalate (abbreviated as PET hereinafter) film has hitherto been used. Recently, with an increase in recording density, prolongation of recording time, and size reduction of a magnetic disk there has been, a demand for a magnetic disk excellent in running characteristic and free of distortion in recording in spite of thinness thereof. Therefore, for maintaining the stiffness of a substrate disk, improvements in the quality of PET film material and in technology of film molding work are under examination.

As long as the film material of a magnetic disk is PET, however, the magnetic disk will be short of mechanical strength when made thinner than a certain thickness and thus be accompanied with drawbacks such as impaired running characteristic or distortion in recording. Further, because of a shortcoming of the biaxially stretched PET film which is insufficient in tensile strength, large in elongation, and inferior in dimensional stability due to high linear expansion coefficient against temperature and humidity, a new type of material is demanded.

SUMMARY OF THE INVENTION

An object of the present invention is to provide a resinous base material having excellent mechanical strength and dimensional stability against variation in temperature and humidity and which can characterize a magnetic disk with an increased information recording density even when the thickness of the base film is markedly reduced.

A magnetic disk of the invention comprises a substrate of a resin composition comprising a polymer being capable of forming an anisotropic phase in the molten state and a magnetic layer formed on at least one surface of said substrate.

It is preferable from a practical point of view that said substrate is a laminate of a plurality of monoaxially oriented sheets, said sheets eventually being multiaxially oriented. The most practical embodiment of the substrate is a laminate of two monoaxially oriented sheets, laminated with each other so that one orientation direction of sheet may intersect that of the other with an angle of about 90°, said sheets being eventually biaxially oriented.

The present invention is directed toward attaining the above object and relates to a magnetic disk characterized in that a magnetic layer is formed on at least one surface of a substrate layer whose major component is a sheet of a polymer composition forming an anisotropic molten phase and capable of melt processing.

A resinous material forming a substrate of the magnetic disk of the present invention is a thermoplastic polymer composition which shows optical anisotropy when melted and is capable of melt processing and generally categorized a thermotropic liquid crystal polymer.

A polymer which forms an anisotropic molten phase as mentioned above has a characteristic that the chains of polymer molecules have a regular, parallel arrangement. A state in which molecules have such an arrangement is often called a liquid crystal state or a nematic phase of a liquid crystal substance. Such a polymer is composed of monomers having a plurality of chain extending bonds which are slender, flat, fairly stiff along the longitudinal axis of the molecule, and generally in either coaxial or parallel relation with each other.

The nature of an anisotropic molten phase can be cofirmed by the customary polarized light inspection method utilizing crossed polarizers. More precisely, confirmation of the anisotropic molten phase can be performed by the use of a Leitz polarizing microscope and the observation of a sample placed on a Leitz hot stage at 40 magnifications is an atmosphere of nitrogen. The above-described polymer is optically anisotropic. That is, the polymer is permeable to light when inspected between crossed polarizers. If a sample is optically anisotropic, it will permit the polarized light to pass therethrough even in a state of standstill.

Components of the polymers forming an anisotropic molten phase include:

① one composed of one or more of aromatic dicarboxylic acids and alicyclic dicarboxylic acids;

② one composed of one or more of aromatic diols, alicyclic diols, and aliphtic diols;

③ one composed of one or more of aromatic hydroxy carboxylic acids;

④ one composed of one or more of aromatic thiol carboxylic acids;

⑤ one composed of one or more of aromatic dithiols and aromatic thiolphenols; and ⑥ one composed of one or more of aromatic hydroxy amines and aromatic diamines.

Polymers forming an anisotropic molten phase are each composed of any of the following combinations:

(I) polyester comprising ① and ②;
(II) polyester comprising ③ only;
(III) polyester comprising ①, ②, and ③;
(IV) polythiol ester comprising ④ only;
(V) polythiol ester comprising ① and ⑤;
(VI) polythiol ester comprising ①, ④, and ⑤;
(VII) polyester amide comprising ①, ③, and ⑥; and
(VIII) polyester amide comprising ①, ②, ③, and ⑥.

Among polymers which are not included in the category of the combinations of the above-listed components but which can form an anisotropic molten phase are aromatic polyazomethines, for example, poly (nitrilo-2-methyl-1,4-phenylenenitriloethylidyne-1,4-phenyleneethylidyne); poly(nitrilo-2-methyl-1,4-phenylenenitrilomethylidyne-1,4-phenylenemethylidyne); and poly (nitrilo-2-chloro-1,4-phenylenenitrilomethylidyne-1,4-phenylenemethylidyne).

Further, among other polymers which are not included in the category of the combinations of the above-listed components but which can form an anisotropic molten phase, are polyester carbonates. Some of these carbonates substantially consist of 4-oxybenzoyl, dioxyphenyl, dioxycarbonyl and terephthaloyl units.

Compounds which belong to components (I) to (VIII) mentioned above are as follows:

Aromatic dicarboxylic acids, such as terephthalic, 4,4'-diphenyldicarboxylic, 4,4'-triphenyldicarboxylic, 2,6-naphthalenedicarboxylic, diphenyl ether-4,4'-dicarboxylic, diphenoxyethane-4,4'-dicarboxylic, diphenoxybutane-4,4'-dicarboxylic, diphenylethane-4,4'-dicarboxylic, isophthalic, diphenyl ether-3,3'-dicarboxylic, diphenoxyethane-3,3'-dicarboxylic, diphenylethane-3,3'-dicarboxylic, and naphthalene-1,6-dicarboxylic acids; and alkyl-, alkoxy-, or halogen-substituted derivatives of the abovesaid aromatic dicarboxylic acids such as chloroterephthalic, dichloroterephthalic, bromoterephthalic, methylterephthalic, dimethylterephthalic, ethylterephthalic, methoxyterephthalic, and ethoxyterephthalic acids.

Alicyclic dicarboxylic acids such as trans-1,4-cyclohexanedicarboxylic, cis-1,4-cyclohexanedicarboxylic, and 1,3-cyclohexanedicarboxylic acids; and alkyl-, alkoxy-, or halogen-substituted derivatives of the abovesaid alicyclic dicarboxylic acids such as trans-1,4-(1-methyl)cyclohexanedicarboxylic and trans-1,4-(1-chloro)cyclohexanedicarboxylic acids.

Aromatic diols such as hydroquinone, resorcinol, 4,4'-dihydroxydiphenyl, 4,4'-dihydroxytriphenyl, 2,6-naphthalenediol, 4,4'-dihydroxydiphenyl ether, bis(4-hydroxyphenoxy)ethane, 3,3'-dihydroxydiphenyl, 3,3'-dihydroxydiphenyl ether, 1,6-naphthalenediol, 2,2-bis(4-hydroxyphenyl)propane, and 2,2-bis(4-hydroxyphenyl)methane; and alkyl-, alkoxy-, or halogen-substituted derivatives of the abovesaid aromatic diols such as chlorohydroquinone, methylhydroquinone, 1-butylhydroquinone, phenylhydroquinone, methoxyhydroquinone, phenoxyhydroquinone, 4-chlororesorcinol, and 4-methylresorcinol.

Alicyclic diols such as trans-1,4-cyclohexanediol, cis-1,4-cyclohexanediol, trans-1,4-cyclohexanedimethanol, cis-1,4-cyclohexanedimethanol, trans-1,3-cyclohexanediol, cis-1,2-cyclohexanediol, and trans-1,3-cyclohexanedimethanol; and alkyl-, alkoxy-, or halogen-substituted derivatives of the abovesaid alicyclic diols such as trans-1,4-(1-methyl)cyclohexanediol and trans-1,4-(1-chloro)cyclohexanediol.

Aliphatic diols including straight-chain and branched aliphatic diols such as ethylene glycol, 1,3-propanediol, 1,4-butanediol, and neopentyl glycol.

Aromatic hydroxycarboxylic acids such as 4-hydroxybenzoic, 3-hydroxybenzoic, 6-hydroxy-2-naphthoic, and 6-hydroxy-1naphthoic acids; and alkyl-, alkoxy-, or halogen-substituted derivatives of the aromatic hydroxycarboxylic acids such as 3-methyl-4-hydroxybenzoic, 3,5-dimethyl-4-hydroxybenzoic, 2,6-dimethyl-4-hydroxybenzoic, 3-methoxy-4-hydroxybenzoic, 3,5-dimethoxy-4-hydroxybenzoic, 6-hydroxy-5-methyl-2-naphthoic, 6-hydroxy-5-methoxy-2-naphthoic, 3-chloro-4-hydroxybenzoic, 2-chloro-4-hydroxybenzoic, 2,3-dichloro-4-hydroxybenzoic, 3,5-dichloro-4-hydroxybenzoic, 2,5-dichloro-4-hydroxybenzoic, 3-bromo-4-hydroxybenzoic, 6-hydroxy-5-chloro-2-naphthoic, 6-hydroxy-7-chloro-2-naphthoic, and 6-hydroxy-5,7-dichloro-2-naphthoic acids.

Aromatic mercapto carboxylic acids such as 4-mercaptobenzoic, 3-mercaptobenzoic, 6-mercapto-2-naphthoic, and 7-mercapto-2-naphthoic acids.

Aromatic dithiols such as benzene-1,4-dithiol, benzene-1,3-dithiol, 2,6-naphthalenedithiol, and 2,7-naphthalenedithiol.

Aromatic mercapto phenols such as 4-mercaptophenol, 3-mercaptophenol, 6-mercaptophenol, and 7-mercaptophenol.

Aromatic hydroxy amines and aromatic diamines such as 4-aminophenol, N-methyl-4-aminophenol, 1,4-phenylenediamine, N-methyl-1,4-phenylenediamine, N,N'-dimethyl-1,4-phenylenediamine, 3-aminophenol, 3-methyl-4-aminophenol, 3-methyl-4-aminophenol, 2-chloro-4-aminophenol, 4-amino-1-naphthol, 4-amino-4'-hydroxydiphenyl, 4-amino-4'-hydroxydiphenyl ether, 4-amino-4'-hydroxydiphenylmethane, 4-amino-4'-hydroxydiphenyl sulfide, 4,4'-diaminodiphenyl sulfide (thiodianiline), 4,4'-diaminodiphenyl sulfone, 2,5-diaminotoluene, 4,4'-ethylenedianiline, 4,4'-diaminodiphenoxyethane, 4,4'-diaminodiphenylmethane (methylenedianiline), and 4,4'-diaminodiphenyl ether (oxydianiline).

The above-listed polymers (I) to (VIII) composed of the above components include those which can form an anisotropic molten phase and those which can not according to the kind of component, compositional ratio in the polymer, and sequence distribution, and only those polymers which can form an anisotropic molten phase among the above-listed polymers can be used in the present invention.

Polyesters (I), (II), and (III) and polyester amide (VIII) as polymers forming an anisotropic molten phase and suitable for use in the present invention can be produced by various methods of ester formation comprising a reaction among organic monomer compounds, each having a functional group which can form required repeating units by condensation. Such a functional group includes, for example, carboxyl, hydroxyl, ester, acyloxy, acyl halide, and amine groups. The abovesaid organic monomer compound can be reacted by melt acidolysis method in the absence of heat exchange fluid. According to this method, monomers are heated together first to form a melt of the reactants. With the proceeding of the reaction, solid polymer particles become suspended in the melt. For easy removal of volatile substances (e.g., acetic acid or water) formed as by-products at the final stage of the condensation, the reaction system may be evacuated.

The slurry polymerization, too, is applicable to the formation of fully aromatic polyester preferably used in the present invention. Solid products obtained by this method are in a state of suspension in the medium for heat exchange.

In any of the processes employing the abovesaid melt acidolysis and slurry polymerization, organic monomeric reactants leading to a fully aromatic polyester can take part in the reaction in the modified form, i.e. as a lower acyl ester, obtained by esterification of the hydroxyl group of said monomer at an ordinary temperature. The lower acyl group has preferably two to four carbon atoms. Acetates of such organic monomeric reactants are preferably used in the reaction.

Typical examples of catalysts usable in any of the melt acidolysis and slurry methods are dialkyltin oxide (e.g., dibutylin oxide), diaryltin oxide, titanium dioxide, antimony trioxide, alkoxytitanium silicate, titanium alkoxide, alkali and alkaline earth metal salts of carboxylic acids (e.g., zinc acetate), Lewis acid (e.g., $BF_3$), and gaseous acid catalyst such as hydrogen halide (e.g., HCl). The amount of the catalyst is generally about 0.001 to 1% by weight, particularly, about 0.01 to 0.2% by weight of the total weight of the monomers.

Fully aromatic polymers suitable for use in the present invention tend to be substantially insoluble in common solvents and therefore are unsuitable for solution processing. However, as described above, such polymers are readily amenable to ordinary melt processing. Particularly preferable fully aromatic polymers are somewhat soluble in pentafluorophenol.

Weight-average molecular weights of the fully aromatic polyesters suitable for use in the present invention range from about 2,000 to 200,000, preferably about 10,000 to 50,000, and more desirably about 20,000 to 25,000. On the other hand, molecular weights of preferable fully aromatic polyester amides are generally between about 5,000 and 50,000, preferably about 10,000 and 30,000, for example, 15,000 and 17,000. These molecular weights can be measured by gel permeation chromatography and other standard methods not causing dissolution of polymers, for example, determination of terminal groups by the infrared spectrophotometry of a compression-formed film. The molecular weights can be measured by preparing a pentafluorophenol solution and using light scattering method.

The abovesaid fully aromatic polyester and polyester amide, when dissolved in pentafluorophenol at a concentration of 0.1 wt % at 60° C., generally show a logarithmic viscosity (I.V.) of at least about 2.0 dl/g, for example, from about 2.0 to 10.0 dl/g.

Polyesters forming an anisotropic molten phase particularly suitable for use in the present invention contain repeating units containing naphthalene moieties, such as 6-hydroxy-2-naphthoic acid, 2,6-dihydroxynaphthalene, and 2,6-dicarboxynaphthalene in quantities larger than about 10 mol %. Preferable polyester amides contain repeating units of the abovesaid naphthalene moieties and the other moieties comprising 4-aminophenol or 1,4-phenylenediamine. More specifically, these amides are as follows:

(1) Polyester essentially composed of the following repeating units I and II:

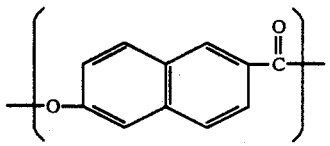

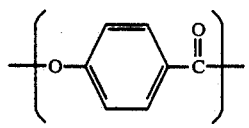

This polyester contains about 10 to 90 mol % of unit I and about 10 to 90 mol % of unit II. In one embodiment, unit I is present in a quantity ranging from about 65 to 85 mol %, preferably about 70 to 80 mol % (e.g., about 75 mol %). In another embodiment, unit II is present in a quantity of as small as about 15 to 35 mol %, preferably 20 to 30 mol %. In some cases, at least part of hydrogen atoms bonded to the ring may be substituted by a substituent selected from among an alkyl group of 1 to 4 carbon atoms, an alkoxy group of 1 to 4 carbon atoms, halogen, phenyl, substituted phenyl, and a combination of these components.

(2) Polyester essentially composed of the following repeating units I, II, and III:

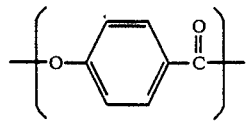

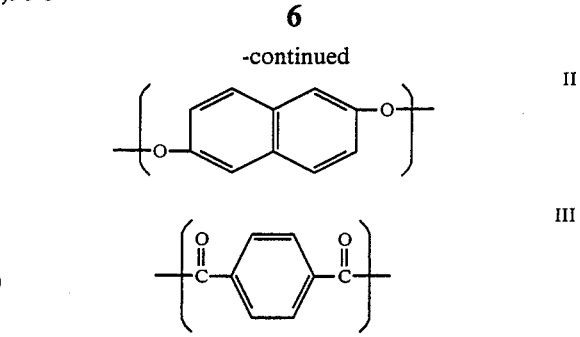

This polyester contains unit I in a quantity of about 30 to 70 mol % and preferably composed of about 40 to 60 mol % of unit I, about 20 to 30 mol % of unit II and about 20 to 30 mol % of unit III. In some cases, at least part of hydrogen atoms bonded to the ring may be substituted by a substituent selected from among an alkyl group of 1 to 4 carbon atoms, an alkoxy group of 1 to 4 carbon atoms, halogen, phenyl, substituted phenyl, and a combination of these components.

(3) Polyester essentially composed of the following repeating units I, II, III, and IV:

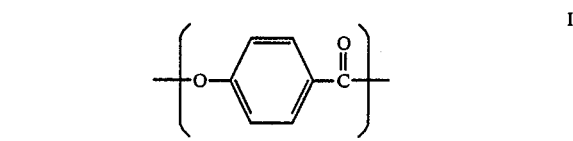

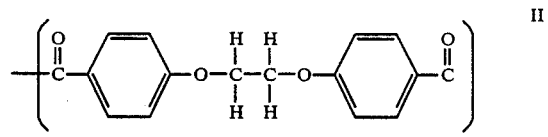

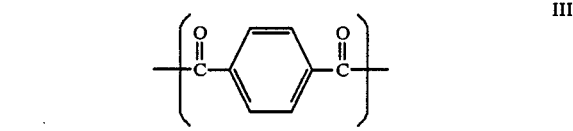

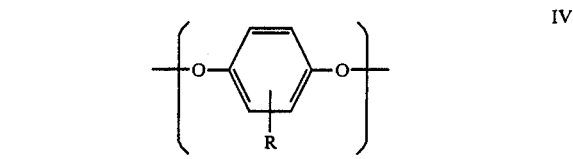

(In the above formulas, R stands for methyl, chloro, bromo, or the combination thereof, which is a substituent for the hydrogen atom on the aromatic ring.) This polyester is composed of about 20 to 60 mol % of unit I, about 5 to 18 mol % of unit II, about 5 to 35 mol % of unit III and about 20 to 40 mol % of unit IV, preferably, about 35 to 45 mol % of unit I, about 10 to 15 mol % of unit II, about 15 to 25 mol % of unit III and about 25 to 35 mol % of unit IV. The total molar concentration of units II and III is substantially equal to that of unit IV. In some cases, at least part of hydrogen atoms bonded to the ring may be substituted by a substituent selected from among an alkyl group of 1 to 4 carbon atoms, an alkoxy group of 1 to 4 carbon atoms, halogen, phenyl, substituted phenyl, and a combination of these components. This fully aromatic polyester generally shows a logarithmic viscosity of at least 2.0 dl/g, for example, 2.0 to 10.0 dl/g, when dissolved in pentafluorophenol at a concentration of 0.3 w/v% at a temperature of 60° C.

(4) Polyester essentially composed of the following repeating units I, II, II, and IV:

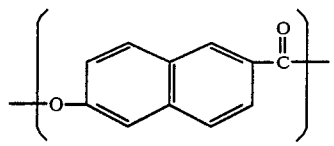

I

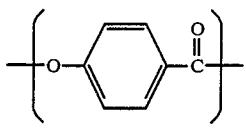

II

III Dioxyaryl unit represented by the general formula ─(O—Ar—O)─ (wherein Ar represents a bivalent group containing at least one aromatic ring).

IV Dicarboxyaryl unit represented by the general formula

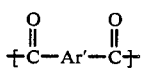

(wherein Ar' represents a bivalent group containing at least one aromatic ring).

This polyester is composed of about 20 to 40 mol % of unit I, from more than 10 up to about 50 mol % of unit II, from more than 5 up to about 30 mol % of unit III, and from more than 5 up to about 30 mol % of unit IV, preferably about 20 to 30 mol % (for example, about 25 mol %) of unit I, about 25 to 40 mol % (for example, about 35 mol %) of unit II, about 15 to 25 mol % (for example, about 20 mol %) of unit III and about 15 to 25 mol % (for example, about 20 mol %) of unit IV. In some cases, at least part of hydrogen atoms bonded to the ring may be substituted by a substituent selected from among an alkyl group 1 to 4 carbon atoms, an alkoxy group of 1 to 4 carbon atoms, phenyl, substituted phenyl, and a combination of these components.

The units III and IV are preferably symmetrical in the sense that bivalent bonds which bond these units to other units on both sides in main chains of polymers are positionally symmetrical on one or two aromatic rings (for example, these units are in positions of para with each other or on the diagonal ring when present on the naphthalene ring). However, non-symmetrical units such as those derived from resorcinol or isophthalic acid are also usable.

A preferable dioxyaryl unit III is

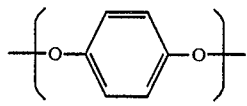

and a preferable dicarboxyaryl unit IV is

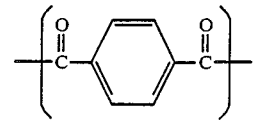

(5) Polyester essentially composed of the following repeating units I, II, and III:

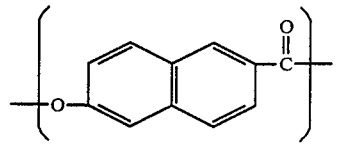

II Dioxyaryl unit represented by the general formula ─(O—Ar—O)─ (wherein Ar represents a bivalent group containing at least one aromatic ring).

III Dicarboxyaryl unit represented by the general formula

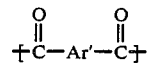

(wherein Ar' represents a bivalent group containing at least one aromatic ring).

This polyester is composed of about 10 to 90 mol % of unit I, 5 to 45 mol % of unit II and 5 to 45 mol % of unit III, preferably about 20 to 80 mol % of unit I, about 10 to 40 mol % of unit II and about 10 to 40 mol % of unit III. More desirably, this polyester is composed of about 60 to 80 mol % of unit I, about 10 to 20 mol % of unit II and about 10 to 20 mol % of unit III. In some cases, at least part of hydrogen atoms may be substituted by a substituent selected from among an alkyl group of 1 to 4 carbon atoms, an alkoxy group of 1 to 4 carbon atoms, halogen, phenyl, and substituted phenyl.

A preferable dioxyaryl unit II is

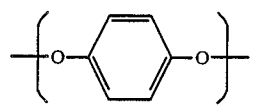

and a preferable dicarboxyaryl unit III is

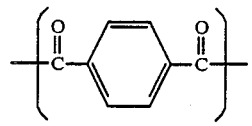

(6) Polyester amide essentially composed of the following repeating units I, II, III, and IV:

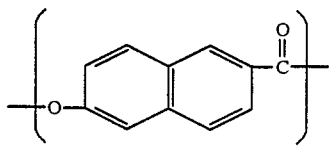

II A unit represented by the general formula

(wherein A represents a bivalent group containing at least one aromatic ring or a bivalent trans cyclohexane group).

III A unit represented by the general formula +Y—Ar—Z+ (wherein Ar represents a bivalent group containing at least one aromatic ring; Y represents O, NH, or NR; Z represents NH or NR, and R represents alkyl group of 1 to 6 carbon atoms or an aryl group).

IV A unit represented by the general formula +O—Ar'—O+ (wherein Ar' represents a bivalent group containing at least one aromatic ring).

This polyester amide is composed of about 10 to 90 mol % of unit I, about 5 to 45 mol % of unit II, about 5 to 45 mol % of unit III and about 0 to 40 mol % of unit IV. In some cases, at least part of hydrogen atoms bonded to the ring may be substituted by a substituent selected from among an alkyl group of 1 to 4 carbon atoms, an alkoxy group of 1 to 4 carbon atoms, halogen, phenyl, substituted phenyl, and a combination of these components.

A preferable dicarboxyaryl unit II is

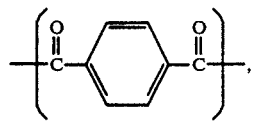

a preferable unit III is

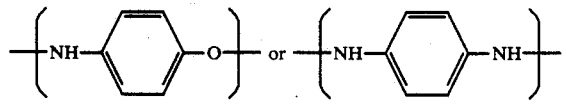

and a preferable dioxyaryl unit IV is

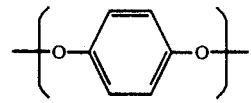

Polymers which form an anisotropic molten phase according to the present invention include one wherein one part of a high-molecular chain is composed of a segment of a polymer forming an anisotropic molten phase as described above and the other part is composed of a segment of a thermoplastic resin not forming an anisotropic molten phase.

The polymer composition forming an anisotropic molten phase and capable of melt processing to be used in the present invention may further contain one or more of ① other polymers forming an anisotropic molten phase, ② thermoplastic resins not forming an anisotropic molten phase, ③ thermosetting resins, ④ low-molecular organic compounds, and ⑤ inorganic substances. The polymer part forming an anisotropic molten phase may be or may not be thermodynamically compatible with the other part of the composition.

The thermoplastic resins ② include, for example, polyethylene, polypropylene, polybutylene, polybutadiene, polyisoprene, polyvinyl acetate, polyvinyl chloride, polyvinylidene chloride, polystyrene, acrylic resin, ABS resin, AS resin, BS resin, polyurethane, silicone resin, fluororesin, polyacetal, polycarbonate, polyethylene, terephthalate, polybutylene terephthalate, aromatic polyester, polyamide, polyacrylonitrile, polyvinyl alcohol, polyvinyl ether, polyether imide, polyamide imide, polyether ether imide, polyether ether ketone, polyether sulfone, polysulfone, polyphenylene sulfide, and polyphenylene oxide.

The thermosetting resins ③ include, for example, phenolic, epoxy, melamine, urea, unsaturated polyester and alkyd resins.

The low-molecular organic compounds ④ include, for example, additives for common thermoplastic and thermosetting resins, such as plasticizer, light-resistant and weather-proof stabilizers such as anti-oxidant and ultraviolet absorber, nucleator, anti-static agent, fire-proofing compound, coloring agent such as dyestuff and pigment, foaming agent, as well as crosslinking agents such as divinyl compound, peroxide, and vulcanizer, and low-molecular organic compound used as lubricant for improving fluidity and mold releasability.

The inorganic substances ⑤ include, for example, additives for common thermoplastic and thermosetting resins, that is, ordinary inorganic fibers such as glass, carbon, metallic, ceramic, and boron fibers and asbestos; powdery substances such as calcium carbonate, highly dispersive silicic acid, alumina, aluminium hydroxide, talcum powder, mica, glass flake, glass bead, quarz powder, siliceous sand, various metal powders, carbon black, barium sulfate, and calcium sulfate; inorganic compounds such as silicone carbide, alumina, boron nitrate, and silicon nitride; and whisker and metallic whisker.

In the polymer composition of the present invention, the polymer chains, when being melted, are highly orderly oriented even in a static state and demonstrate a high degree of orientation because of the flow of the melt in melt molding, thereby showing a higher degree of orientation in a two-dimensional article such as a thin molding. Accordingly, the polymer composition of the present invention fully satisfies the requirements including dimensional stability, various mechanical properties, and heat resistance demanded for the base resin as a substrate of a magnetic disk. However, for a magnetic disk used as a floppy disk shaped circular for convenience of use, not only excellent dimensional stability, that is, low linear expansion coefficients in all directions in the circular shape against temperature and humidity, but also isotropy in these values are desired.

Japanese patent laid-open No. 31718/1983 has proposed a multiaxially oriented high-performance laminate composed of laminated monoaxially oriented sheets of a thermotropic liquid crystal polymer and this polymer is preferably used as a substrate in the present invention.

The abovesaid patent has disclosed a method of manufacturing a multiaxially oriented laminate having desirable mechanical properties and excellent resistance to heat and chemicals, comprising the steps of (a) preparing at least two sheets of substantially one-directionally oriented polymers capable of forming an anisotropic molten phase; and (b) exposing said at least two sheets to heat bonding conditions in such a way that axial directions of the two sheets may intersect each other at a certain degree of angle to compose a multiaxially oriented laminate while maintaining substantial one-directional orientation in each sheet. In embodying the present invention, a laminate film obtained by heat-pressing two sheets of polymers as described above which are disposed to intersect each other at an angle of about 90° is preferably used.

Thus, formation of a biaxially oriented laminate film from the polymer composition forming an anisotropic molten phase make it possible to obtain a disk substrate having a desirable isotropic linear expansion coefficient.

A magnetic layer for a magnetic disk of the present invention is not specific and any layer composed of known magnetic material is applicable. Particular examples of the layer include those composed of $\gamma$—$Fe_2O_3$.-$CrO_3$, iron oxide doped with Co, metals such as Fe, Co, or Ni, and alloys of these metals and, particularly, a magnetic layer substantially free of thin film type of organic polymer is preferable.

In a method of manufacturing a magnetic disk according to the present invention, polymers forming an anisotropic molten phase can be made into a film by employing film processing techniques generally applied to thermoplastic resins, for example, T-die method or inflation method as the process for non-stretched or stretched film.

When required, heat-treatment of the film thus produced enables further improvement in the mechanical strength of the film. An appropriate condition for heat treatment includes a temperature range of 200° and 270° C.

The monoaxially oriented films thus obtained are laminated into a multiaxially oriented film by a method as disclosed in the aforesaid patent laid-open No. 31718/1983.

In forming biaxially and multiaxially oriented sheets with the application of lamination, adhesives may be used if desired. Applicable adhesives are of hot melt type, reactive type, organic solvent type, and emulsion type, which are used in the manufacture of ordinary laminate films, among which a hot melt type of adhesive is desirable because of easiness in processing and polyester, polyamide, polyacrylic, polyvinyl acetate and their copolymers are used for this purpose.

A magnetic layer is formed on the disk substrate thus obtained. Various known methods of layer formation are applicable. They include, for example, coating with a solution prepared by dissolving powders of $\gamma$—$Fe_2O_2.Cr_2O_3$, iron oxide doped with Co, metals such as Fe, Ni, or Co, and alloys composed of these metals together with resin binders such as copolymer of vinyl chloride and vinyl acetate, polyurethane, polybutadiene, polyepoxy, polyacrylic, or phenolic resin, and additives such as various stabilizers, dispersant, antistatic agent, and lubricant in a solvent, and direct formation of a layer of the desired metal by sputtering, vapor deposition, or ion plating. The known corona-discharge treatment (in the air, nitrogen, or carbonic acid gas) prior to formation of the above-said magnetic layer onto a substrate film, lamination of other kinds of polymers for imparting adhesiveness, slipperiness, or surface smoothness, or covering by the use of other kinds of compounds may be applicable. In this way, the manufacture of a disk of either coating type or vapor deposition type is possible.

Addition of inorganic or organic additives such as antioxidant, heat stabilizer, ultraviolet ray absorber, nucleator, or surface projection forming agent in normal quantities within the range not interfering with the object of the present invention to a film to be used as a substrate according to the present invention is allowable.

EFFECT OF THE INVENTION

The present invention, as has been described above, provides a magnetic disk having a magnetic layer formed on at least one surface of a film composed of specified polymers and excellent in physical properties and, therefore, can exhibit superior effects as follows:

(1) A magnetic disk low in heat contraction, excellent in running characteristic even with a reduced thickness, and free of distortion in recording can be obtained and, as a result, reduction in film thickness, reduction in size, and increase in recording density of the magnetic disk is made possible.

(2) The magnetic disk can afford a magnetic recording material excellent in adhesiveness between the disk substrate and the magnetic layer and, accordingly, entirely free of distortion in recording.

(3) The magnetic disk is excellent in mechanical strength and dimensional stability and exhibits high performance as a magnetic disk because of an isotropic low linear expansion coefficient thereof resulting from the use of biaxially oriented laminated film.

A magnetic disk of the present invention is usable as a floppy disk for all kinds of magnetic recording.

EMBODIMENT

The way of embodying the present invention will now be described with reference to examples to which, however, the present invention is not limited.

REFERENCE EXAMPLES 1 TO 4

Pellets containing polymers A, B, C, and D forming an anisotropic molten phase which will be described later were extrusion-molded by means of a film extruder provided with a slit dice at extrusion temperatures of 310°, 320°, 315°, and 320° C., respectively, with a drawing speed of 5 m/min, when 82 mm wide and 0.15 mm thick films were obtained. The films were made up by laminating two sheets of films of the same kind in such an arrangement that the longitudinal axis of one film perpendicularly intersects that of the other and by hot-pressing the laminated film at 300° C. Characteristics of these laminated films are shown in Table 1.

Mechanical properties of these films were measured in accordance with ASTM, D-882, and linear expansion coefficients were measured by the constant load elongation tester (made by Nippon Jido Seigyo K. K.).

REFERENCE COMPARATIVE EXAMPLE 1

Chips of polyethylene terephthalate were extruded by an extruder provided with a T-die while melted at 290° C. and then wound around a quenching drum for solidifying the molten product into a non-stretched film. The obtained film was heated to 80° C. by a pre-heating roll and, while being subjected to rapid heating from both sides with a silicon carbide heating element heated to 1000° C., stretched 3.7 times lengthwise and then 3.8 times widthwise at 110° C., a film of 0.20 mm in thickness was obtained. Characteristics of this film, too, are listed in Table 1.

The polymers A, B, C, and D forming an anisotropic molten phase and used as resins for film formation are composed of the following structural units:

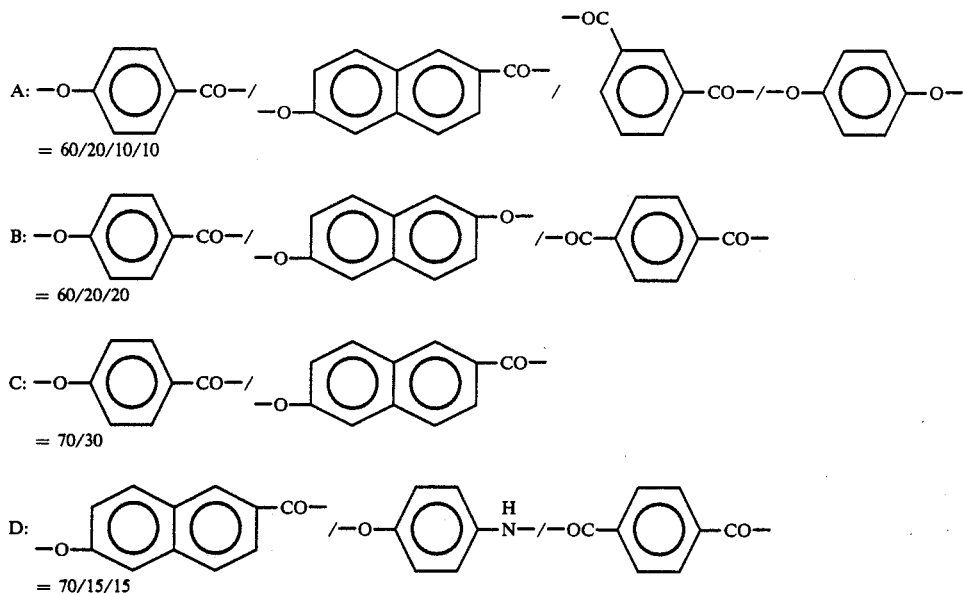

A: = 60/20/10/10

B: = 60/20/20

C: = 70/30

D: = 70/15/15

A detailed method of preparing the above resins A, B, C, and D will now be described.

RESIN A 1081 parts by weight of 4-acetoxybenzoic acid, 460 parts by weight of 6-acetoxy-2-naphthoic acid, 166 parts by weight of isophthalic acid, and 194 parts by weight of 1,4-diacetoxybenzene were fed into a reactor equipped with an agitator, a nitrogen inlet tube, and a distilling tube, and heated to 260° C. in a nitrogen stream. While distilling off acetic acid from the reactor, the mixture was vigorously agitated for 2.5 hours at 260° C. and further for 3 hours at 280° C. Then, the temperature was raised to 320° C. and, after the suspension of introduction of nitrogen, the pressure in the reactor was gradually decreased to 0.1 mmHg with the lapse of 15 minutes. The mixture was agitated for 1 hour at the same temperature and pressure.

The obtained polymer showed a concentration of 0.1 wt % and specific viscosity of 5.0 as measured in pentafluorophenol at 60° C.

RESIN B 1081 parts by weight of 4-acetoxybenzoic acid, 489 parts by weight of 2,6-diacetoxynaphthalene, and 332 parts by weight of terephthalic acid were fed into a reactor equipped with an agitator, a nitrogen inlet tube, and a distilling tube, and heated to 250° C. in a nitrogen stream. While distilling off acetic acid from the reactor, the mixture was vigorously agitated for 2 hours at 250° C. and further for 2.5 hours at 280° C. Then, the temperature was raised to 320° C. and, after the suspension of introduction of nitrogen, the pressure in the reactor was gradually decreased to 0.2 mmHg with the lapse of 30 minutes. The mixture was agitated for 1.5 hours at the same temperature and pressure.

The obtained polymer showed a concentration of 0.1 wt % and specific viscosity of 2.5 as measured in pentafluorophenol at 60° C.

RESIN C 1261 parts by weight of 4-acetoxybenzoic acid and 691 parts by weight of 6-acetoxy-2-naphthoic acid were fed into a reactor equipped with an agitator, a nitrogen inlet tube, and a distilling tube, and heated to 250° C. in a nitrogen stream. While distilling off acetic acid from the reactor, the mixture was vigorously agitated for 3 hours at 250° C. and further for 2 hours at 280° C. Then, the temperature was raised to 320° C. and, after the suspension of introduction of nitrogen, the pressure in the reactor was gradually decreased to 0.1 mmHg with the lapse of 20 minutes. The mixture was agitated for 1 hour at the same temperature and pressure.

The obtained polymer showed a concentration of 0.1 wt % and specific viscosity of 5.4 as measured in pentafluorophenol at 60° C.

RESIN D 1612 parts by weight of 6-acetoxy-2-naphthoic acid, 290 parts by weight of 4-acetoxyacetanilide, 249 parts by weight of terephthalic acid, and 0.4 parts by weight of sodium acetate were fed into a reactor equipped with an agitator, a nitrogen inlet tube, and a distilling tube, and heated to 250° C. in a nitrogen stream. While distilling off acetic acid from the reactor, the mixture was vigorously agitated for 1 hour at 250° C. and further for 3 hours at 300° C. Then, the temperature was raised to 340° C. and, after the suspension of introduction of nitrogen, the pressure in the reactor was gradually decreased to 0.2 mmHg with the lapse of 30 minutes. The mixture was agitated for 30 minutes at the same temperature and pressure.

The obtained polymer showed a concentration of 0.1 wt % and specific viscosity of 3.9 as measured in pentafluorophenol at 60° C.

TABLE 1

| Reference Example | Resin | Mechanical properties | | Linear expansion coefficient | |
|---|---|---|---|---|---|
| | | Tensile strength (MPa) | Elongation (%) | Temperature (/°C.) | Humidity (/% RH) |
| 1 | A | 213 | 5.8 | $1 \times 10^{-6}$ | $1 \times 10^{-6}$ |
| 2 | B | 206 | 6.2 | $2 \times 10^{-6}$ | $3 \times 10^{-6}$ |
| 3 | C | 233 | 5.6 | $1 \times 10^{-6}$ | $2 \times 10^{-6}$ |
| 4 | D | 220 | 5.8 | $2 \times 10^{-6}$ | $2 \times 10^{-6}$ |

TABLE 1-continued

| Reference Example | Resin | Mechanical properties | | Linear expansion coefficient | |
|---|---|---|---|---|---|
| | | Tensile strength (MPa) | Elongation (%) | Temperature (/°C.) | Humidity (/% RH) |
| Comparative Example 1 | Biaxially stretched PET | 192 | 95 | $16 \times 10^{-6}$ | $13 \times 10^{-6}$ |

Examples 1 to 4 and Comparative Example 1

The films prepared in accordance with the description of Reference Examples 1 to 4 and Reference Comparative Example 1 were coated with a coating agent containing $\gamma$—$Fe_2O_3$ powder (copolymer of vinyl chloride-vinyl acetate-vinyl alcohol and that of acrylonitrile-butadiene). The linear expansion coefficients of these films are shown in Table 2.

Examples 5 to 8 and Comparative Example 2

The films prepared in accordance with the description of Reference Examples 1 to 4 and Reference Comparative Example 1 were coated with a coating agent containing Co—$\gamma$—$Fe_2O_3$ powder and respective magnetic disks were obtained (Examples 5 to 8 and Comparative Example 2). The linear expansion coefficients of these films are shown in Table 2.

TABLE 2

| Example | Resin | Magnetic substance | Linear expansion coefficient | |
|---|---|---|---|---|
| | | | Temperature (/°C.) | Humidity (/% RH) |
| 1 | A | $\gamma$-$Fe_2O_3$ | $2 \times 10^{-6}$ | $2 \times 10^{-6}$ |
| 2 | B | $\gamma$-$Fe_2O_3$ | $2 \times 10^{-6}$ | $4 \times 10^{-6}$ |
| 3 | C | $\gamma$-$Fe_2O_3$ | $1 \times 10^{-6}$ | $2 \times 10^{-6}$ |
| 4 | D | $\gamma$-$Fe_2O_3$ | $2 \times 10^{-6}$ | $2 \times 10^{-6}$ |
| Comparative Example 1 | Biaxially stretched PET | $\gamma$-$Fe_2O_3$ | $16 \times 10^{-6}$ | $14 \times 10^{-6}$ |

TABLE 3

| Example | Resin | Magnetic substance | Linear expansion coefficient | |
|---|---|---|---|---|
| | | | Temperature (/°C.) | Humidity (/% RH) |
| 5 | A | Co—$\gamma$-$Fe_2O_3$ | $2 \times 10^{-6}$ | $1 \times 10^{-6}$ |
| 6 | B | Co—$\gamma$-$Fe_2O_3$ | $2 \times 10^{-6}$ | $3 \times 10^{-6}$ |
| 7 | C | Co—$\gamma$-$Fe_2O_3$ | $1 \times 10^{-6}$ | $3 \times 10^{-6}$ |
| 8 | D | Co—$\gamma$-$Fe_2O_3$ | $2 \times 10^{-6}$ | $3 \times 10^{-6}$ |
| Comparative Example 2 | Biaxially stretched PET | Co—$\gamma$-$Fe_2O_3$ | $17 \times 10^{-6}$ | $13 \times 10^{-6}$ |

As apparent from Tables 2 and 3, a laminated film composed of polymer films each forming an anisotropic molten phase prepared according to the present invention was provided with a magnetic layer excellent in adhesiveness, and a superior magnetic disk having an isotropic low linear expansion coefficient was obtained by employing the abovesaid film as a base film of the disk.

The embodiments of the invention in which an exclusive property or privilege is claimed are defined as follows:

1. A magnetic disk comprising a resin composition substrate which comprises a liquid crystal polymer being capable of the optical anisotropic phase in the molten state and a magnetic layer formed on at least one surface of said substrate.

2. The magnetic disk of claim 1, in which said substrate is a laminate of a plurality of monoaxially oriented sheets, said sheets eventually being multiaxially oriented.

3. The magnetic disk of claim 1, in which said substrate is a laminate of two monoaxially oriented sheets, laminated with each other so that the orientation direction of one sheet intersects the orientation direction of the other sheet at an angle of about 90°, said sheets being eventually biaxially oriented.

4. The magnetic disk of claim 1, wherein the polymer is selected from the group consisting of polyazomethine, polycarbonate and polyester.

5. The magnetic disk of claim 4, wherein the polymer is polyazomethine.

6. The magnetic disk of claim 5, wherein the polyazomethine is selected from the group consisting of poly (nitrilo-2-methyl-1,4-phenylene-nitriloethylidyne-1,4-phenyleneethylidyne), poly (nitrilo-2-methyl-1,4-phenylenenitrilomethylidyne-1,4-phenylenemethylidyne) and poly (nitrilo-2-chloro-1,4-phenylenenitrilomethylidyne-1,4-phenylenemethylidyne).

7. The magnetic disk of claim 4, wherein the polymer is polycarbonate.

8. The magnetic disk of claim 7, wherein the polycarbonate consists essentially of units selected from 4-oxybenzoyl, dioxyphenyl, dioxycarbonyl or terephthaloyl.

9. The magnetic disk of claim 4, wherein the polyester is a polythioester.

10. The magnetic disk of claim 9, wherein the polyester is a polythioester comprising one or more aromatic thiocarboxylic acids.

11. The magnetic disk of claim 9, wherein the polyester is a polythioester comprising one or more members selected from the group consisting of aromatic dicarboxylic acids, alicyclic dicarboxylic acids and mixtures thereof; and one or more members selected from the group consisting of aromatic dithiols, aromatic thiophenols and mixtures thereof.

12. The magnetic disk of claim 10, wherein the aromatic thiocarboxylic acids are selected from 4-mercaptobenzoic acid, 3-mercaptobenzoic acid, 6-mercapto-2-naphthoic acid, 7-mercapto-2-naphthoic acid or mixtures thereof.

13. The magnetic disk of claim 11, wherein the aromatic dithiols are selected from benzene-1,4-dithiol, benzene-1,3-dithiol,2,6-naphthalene-dithiol,2,7-naphthalene-dithiol or mixtures thereof.

14. The magnetic disk of claim 11, wherein the aromatic thiophenols are selected from 4-mercaptophenol, 3-mercaptophenol, 6-mercaptophenol, 7-mercaptophenol or mixtures thereof.

15. The magnetic disk of claim 11, wherein the polythioester further comprises one or more aromatic thiocarboxylic acids.

16. The magnetic disk of claim 12, wherein the polythioester further comprises one or more aromatic thiocarboxylic acids.

17. The magnetic disk of claim 13, wherein the polythioester further comprises one or more aromatic thiocarboxylic acids.

18. The magnetic disk of claim 14, wherein the polythioester further comprises one or more aromatic thiocarboxylic acids.

19. The magnetic disk of claim 4, wherein the polyester is a polyester amide.

20. The magnetic disk of claim 19, wherein the polyester is a polyester amide comprising one or more members selected from the group consisting of aromatic dicarboxylic acids, alicyclic dicarboxylic acids and mixtures thereof; one or more aromatic hydroxy-carboxylic acids; and one or more members selected from the group consisting of aromatic hydroxyamines, aromatic diamines and mixtures thereof.

21. The magnetic disk of claim 20, wherein the aromatic hydroxyamines are selected from 4-aminophenol, N-methylaminophenol, 3-aminophenol, 3-methyl-4-aminophenol, 2-chloro-4-aminophenol, 4-amino-1-naphthol, 4-amino-4'-hydroxydiphenyl, 4-amino-4'-hydroxydiphenyl ether, 4-amino-4'-hydroxydiphenyl methane, 4-amino-4'-hydroxydiphenyl sulfide or mixtures thereof.

22. The magnetic disk of claim 20, wherein the aromatic diamines are selected from 1,4-phenylene-diamine, N-methyl-1,4-phenylene-diamine, N,N'-dimethyl-1,4-phenylene-diamine, 4,4'-diaminophenyl sulfide (thiodianiline), 4,4'-diaminodiphenyl sulfone, 2,5-diaminotoluene, 4,4'-ethylenedianiline, 4,4'-diaminodiphenoxy ethane, 4,4'-diaminodiphenyl methane (methylene dianiline), 4,4'-diaminodiphenyl ether (oxydianiline) or mixtures thereof.

23. The magnetic disk of claim 20, wherein the polyester amide further comprises one or more members selected from the group consisting of aromatic diols, alicyclic diols, aliphatic diols and mixtures thereof.

24. The magnetic disk of claim 21, wherein the polyester amide further comprises one or more members selected from the group consisting of aromatic diols, alicyclic diols, aliphatic diols and mixtures thereof.

25. The magnetic disk of claim 22, wherein the polyester amide further comprises one or more members selected from the group consisting of aromatic diols, alicyclic diols, aliphatic diols and mixtures thereof.

26. The magnetic disk of claim 4, wherein the polyester comprises one or more aromatic hydroxy-carboxylic acids.

27. The magnetic disk of claim 26, wherein the aromatic hydroxy-carboxylic acids are selected from 4-hydroxy benzoic acid, 3-hydroxy benzoic acid, 6-hydroxy-2-naphthoic acid, 6-hydroxy-1-naphthoic acid, 3-methyl-4-hydroxy benzoic acid, 3,5-dimethyl-4-hydroxy benzoic acid, 2,6-dimethyl-4-hydroxy benzoic acid, 3-methoxy-4-hydroxy benzoic acid, 3,5-dimethoxy-4-hydroxy benzoic acid, 6-hydroxy-5-methyl-2-naphthoic acid, 6-hydroxy-5-methoxy-2-naphthoic acid, 3-chloro-4-hydroxy benzoic acid, 2-chloro-4-hydroxy benzoic acid, 2,3-dichloro-4-hydroxy benzoic acid, 3,5-dichloro-4-hydroxy benzoic acid, 2,5-dichloro-4-hydroxy benzoic acid, 3-bromo-4-hydroxy benzoic acid, 6-hydroxy-5-chloro-2-naphthoic acid, 6-hydroxy-7-chloro-2-naphthoic acid, 6-hydroxy-5,7-dichloro-2-naphthoic acid or mixtures thereof.

28. The magnetic disk of claim 4, wherein the polyester comprises one or more members selected from the group consisting of aromatic dicarboxylic acids, alicyclic dicarboxylic acids and mixtures thereof; and one or more members selected from the group consisting of aromatic diols, alicyclic diols, aliphatic diols and mixtures thereof.

29. The magnetic disk of claim 28, wherein the aromatic dicarboxylic acids are selected from terephthalic acid, 4,4'-diphenyl dicarboxylic acid, 4,4'-triphenyl dicarboxylic acid, 2,6-naphthalene dicarboxylic acid, diphenyl ether-4,4'-dicarboxylic acid, diphenoxy ethane-4,4'-dicarboxylic acid, diphenoxy butane-4,4'-dicarboxylic acid, diphenyl ethane-4,4'-dicarboxylic acid, isophthalic acid, diphenyl ether-3,3'-dicarboxylic acid, diphenoxy ethane-3,3'-dicarboxylic acid, diphenyl ethane-3,3'-dicarboxylic acid, and naphthalene-1,6-dicarboxylic acid, chloro-terephthalic acid, dichloroterephthalic acid, bromo-terephthalic acid, ethyl terephthalic acid, methoxy terephthalic acid, ethoxy terephthalic acid, or mixtures thereof.

30. The magnetic disk of claim 28, wherein the alicyclic dicarboxylic acids are selected from trans-1,4-cyclohexane dicarboxylic acid, cis-1,4-cyclohexane dicarboxylic acid, 1,3-cyclohexane dicarboxylic acid, trans-1,4-(1-methyl)cyclohexane dicarboxylic acid, trans-1,4-(1-chloro)cyclohexane dicarboxylic acid or mixtures thereof.

31. The magnetic disk of claim 28, wherein the aromatic diols are selected from hydroquinone resorcinol, 4,4'-dihydroxy diphenyl, 4,4'-dihydroxy triphenyl, 2,6-naphthalene diol, 4,4'-dihydroxy diphenyl ether, bis-(4,hydroxyphenoxy)ethane, 3,3'-dihydroxy diphenyl, 3,3'-dihydroxy diphenyl ether, 1,6-naphthalene diol, 2,2-bis(4-hydroxyphenyl)propane, 2,2-bis(4-hydroxyphenyl)methane, alkyl-, alkoxy-, or halogen-substituted derivatives thereof or mixtures thereof.

32. The magnetic disk of claim 28, wherein the alicyclic diols are trans-1,4-cyclohexane diol, cis-1,4-cyclohexane diol, trans-1,4-cyclohexane diol, trans-1,3-cyclohexane diol, cis-1,2-cyclohexane diol, and trans-1,3-cyclohexane dimethanol, trans-1,4-(1-methyl)cyclohexane diol, trans-1,4-(1-chloro)cyclohexane diol, or mixtures thereof.

33. The magnetic disk of claim 28, wherein the aliphatic diols are selected from the ethylene glycol, 1,3-propane diol, 1,4-butane diol, neopentyl glycol or mixtures thereof.

34. The laminated film of claim 28, wherein the polyester further comprises one or more aromatic hydroxy-carboxylic acids.

35. The magnetic disk of claim 34, wherein the aromatic hydroxy-carboxylic acids are selected from 4-hydroxy benzoic acid, 3-hydroxy benzoic acid, 6-hydroxy-2-naphthoic acid, 6-hydroxy-1-naphthoic acid, 3-methyl-4-hydroxy benzoic acid, 3,5-dimethyl-4-hydroxy benzoic acid, 2,6-dimethyl-4-hydroxy benzoic acid, 3-methoxy-4-hydroxy benzoic acid, 3,5-dimethoxy-4-hydroxy benzoic acid, 6-hydroxy-5-methyl-2-naphthoic acid, 6-hydroxy-5-methoxy-2-naphthoic acid, 3-chloro-4-hydroxy benzoic acid, 2-chloro-4-hydroxy benzoic acid, 2,3-dichloro-4-hydroxy benzoic acid, 3,5-dichloro-4-hydroxy benzoic acid, 2,5-dichloro-4-hydroxy benzoic acid, 3-bromo-4-hydroxy benzoic acid, 6-hydroxy-5-chloro-2-naphthoic acid, 6-hydroxy-7-chloro-2-naphthoic acid, 6-hydroxy-5,7-dichloro-2-naphthoic acid or mixtures thereof.

36. The magnetic disk of claim 28, wherein the polyester has a weight average molecular weight of from about 2,000–200,000.

37. The magnetic disk of claim 19, wherein the polyester amide has a weight average molecular weight of from about 5,000–50,000.

38. The magnetic disk of claim 36, wherein the polyester exhibits a logarithmic viscosity number of at least about 2.0 to 10.0 dl/g, when dissolved at a concentration of 0.1 wt.% in pentafluorophenol at 60° C.

39. The magnetic disk of claim 37, wherein the polyester exhibits a logarithmic viscosity number of at least about 2.0 to 10.0 dl/g, when dissolved at a concentration of 0.1 wt.% in pentafluorophenol at 60° C.

40. The magnetic disk of claim 28, wherein the polyester comprises about 10 mol % or more of 6-hydroxy-2-naphthalene, 2,6-dihydroxy naphthalene, 2,6-dicarboxy naphthalene or mixtures thereof.

41. The magnetic disk of claim 21, wherein the polyester amide comprises about 10 mol% or more of 6-hydroxy-2-naphthalene, 2,6-hydroxy naphthalene, 2,6-dicarboxy naphthalene or mixtures thereof; and 4-aminophenol or 1,4-phenylenediamine.

42. The magnetic disk of claim 4, wherein the polyester is a member selected from (a) a polyester containing about 10 to 90 mol% of units of

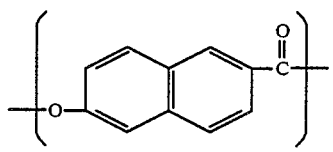

and about 10 to 90 mol% of units of

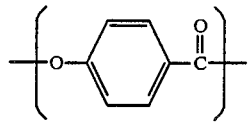

(b) a polyester containing about 40-60 mol% of units of

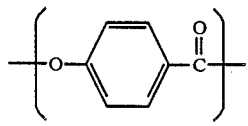

about 20-30 mol% of units of

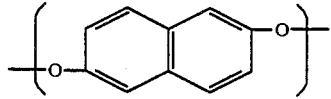

about 20-30 mol% of units of

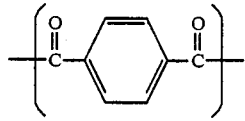

(c) a polyester containing about 20-60 mol% of units of

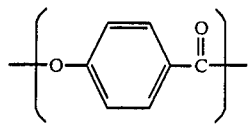

about 5-18 mol% of units of

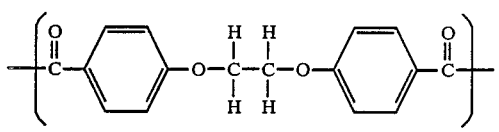

about 5-35 mol% of units of

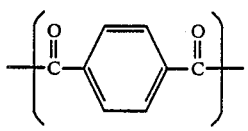

and about 20-40 mol% of units of

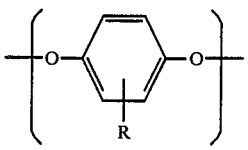

wherein R represents methyl, chloro, bromo or mixtures thereof, (d) a polyester containing about 20-40 mol% of units of

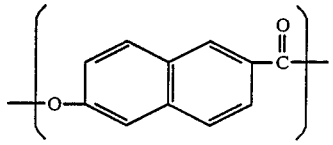

about 10 mol%-50 mol% of units of

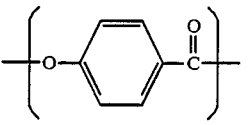

about 5-30 mol% of dioxyaryl units of $+\!\!-\!\!O\!\!-\!\!Ar\!\!-\!\!O\!\!-\!\!+$, wherein Ar represents a bivalent group containing at least one aromatic ring; and about 5-30 mol% of dicarboxyaryl units of

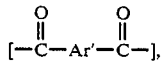

$$[-\overset{O}{\underset{\|}{C}}-Ar'-\overset{O}{\underset{\|}{C}}-],$$

wherein Ar' represents a bivalent group containing at least one aromatic ring, or (e) a polyester containing 10-90 mol% of units of

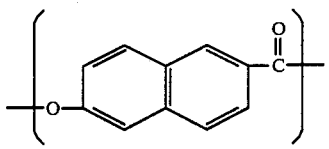

about 5-45 mol% of dioxyaryl units of $+O-Ar-O+$ wherein Ar denotes a bivalent group including at least one aromatic ring, and about 5-45 mol% dicarboxyaryl units of

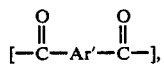

wherein Ar' denotes a bivalent group including at least one aromatic ring.

43. The magnetic disk of claim 19, wherein the polyester is a polyester amide containing 10-90 mol% of units of

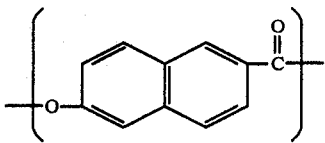

about 5-45 mol% of units of

wherein A represents a bivalent group including at least one aromatic ring, or a bivalent trans-cyclohexane group;
about 5-45 mol% of units of

wherein Ar represents a bivalent group including at least one aromatic ring; Y represents O, NH, or NR; Z represents NH or NR; and R represents an alkyl or aryl group having about 1 to 6 carbon atoms; and
about 0-40 mol% of units of

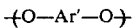

wherein in Ar' represents a bivalent group including at least one aromatic ring.

44. The magnetic disk of claim 1, wherein said anisotropic melt phase forming polymer further comprises:
thermoplastic resins selected from the group consisting of polyethylene, polypropylene, polybutylene, polybutadiene, polyisoprene, polyvinyl acetate, polyvinyl chloride, polyvinylidene chloride, polystyrene, acrylic resins, ABS resin, AS resin, BS resin, polyurethane, silicone resin, fluorine plastics, polyacetal, polycarbonate, polyethylene terephthalate, polybutylene terephthalate, aromatic polyester, polyamide, polyacrylonitrile, polyvinyl alcohol, polyvinyl ether, polyether imide, polyamide imide, polyether ether imide, polyether ether ketone, polyether sulfone, polysulfone, polyphenylene sulfide and polyphenylene oxide.

45. The magnetic disk of claim 1, wherein said anisotropic melt phase forming polymer further comprises:
thermosetting resins selected from the group consisting of phenolic resin, epoxy resin, melamine resin, urea resin, unsaturated polyester resin and alkyd resin.

46. The magnetic disk of claim 1, wherein said anisotropic melt phase forming polymer further comprises:
low-molecular weight organic plasticizers, light fast or weathering stabilizers, antistatic agents, flame retarding agents, coloring agents, foaming agents, crosslinking agents, lubricants or mixtures thereof.

47. The magnetic disk of claim 1, wherein said anisotropic melt phase forming polymer further comprises:
an inorganic material selected from the group consisting of glass, carbon, metallic, ceramic, boron, and asbestos; calcium carbonate, high-dispersion silicic acid, alumina, aluminum hydroxide, talc powder, micro, glass flake, glass beads, silica flour, quartz sand, metallic powder, carbon black, barium sulfate, baked plaster, silicon carbide, alumina, boron nitride, silicon nitride, whiskers and metallic whiskers.

* * * * *